Jan. 3, 1967  V. W. PETERSON  3,295,646
CENTRIFUGALLY OPERATED FLUID CLUTCH
Filed Oct. 5, 1964  2 Sheets-Sheet 2
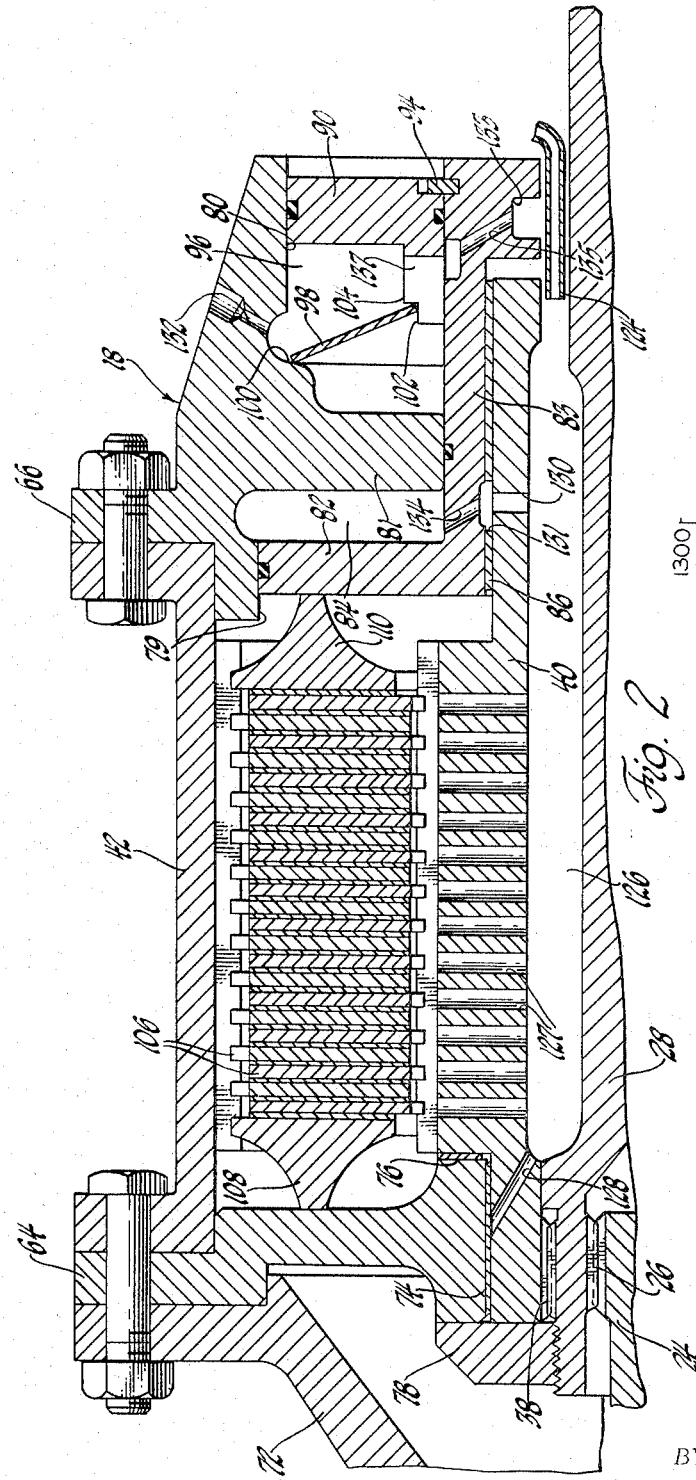
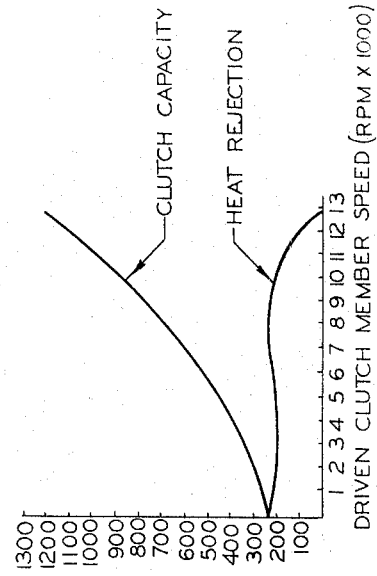
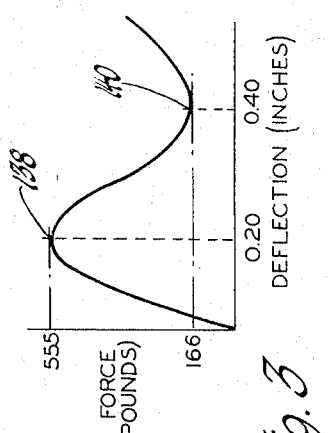
INVENTOR.
Victor W. Peterson
BY
ATTORNEY

United States Patent Office 3,295,646
Patented Jan. 3, 1967

3,295,646
CENTRIFUGALLY OPERATED FLUID CLUTCH
Victor W. Peterson, Indianapolis, Ind., assignor to General Motors Corporation, Detroit, Mich., a corporation of Delaware
Filed Oct. 5, 1964, Ser. No. 401,357
12 Claims. (Cl. 192—85)

This invention relates to a drive transmitting assembly and more particularly to a fluid operated clutch providing controlled coupling and power transmittal.

Where a prime mover is used to drive different driven loads such as in industrial power plant installations, direct coupling between the prime mover and the load to be driven requires the prime mover starter to produce sufficient power output to accelerate both the prime mover and the coupled driven load. Because the driven load does vary from installation to installation, the starter, if it is to be used universally, must have a maximum power output at least sufficient to meet the demands of the prime mover and the largest driven load which is to be encountered, the latter of which may require extremely large power input for acceleration. As an alternative, starters having different power outputs suited to the power requirements of the different prime mover-driven load combinations have been used.

Briefly stated, the principle of this invention lies in the provision of a variable power capacity fluid operated clutch to drivingly couple the prime mover and driven load which maintains the prime mover and driven load uncoupled during prime mover starting and is responsive to subsequent prime mover acceleration to initiate power transmittal. The fluid operated clutch provides a controlled and increasing power capacity for power transmittal during the clutch slip engagement period sufficient to accelerate the driven load at a moderate controlled rate as the prime mover accelerates toward its normal operating speed range. This avoids excessive acceleration requiring higher power capacity to maintain the power absorbed in the clutch and the heat thus generated to a minimum. At clutch lockup which is caused to occur in a speed range approaching the prime mover's normal operating speed range, the fluid operated clutch thereafter responds to continued prime mover acceleration to provide continued increasing power capacity until the normal operating speed range is reached at which the power capacity exceeds the limit of anticipated load fluctuations to prevent clutch slippage during such load fluctuations. In addition there is provided controlled lubrication and cooling of the clutch's friction surfaces.

An object of this invention is to provide in a drive transmitting assembly for coupling a prime mover to a driven load a clutch normally disengaged during prime mover shutdown responsive to prime mover acceleration subsequent to prime mover starting to initiate power transmittal to the driven load and in response to driven load acceleration to provide a controlled and increasing power capacity for power transmittal sufficient to accelerate the driven load as the prime mover continues to accelerate and effect clutch lockup in a speed range approaching the prime mover's normal operating speed range.

It is another object of this invention to provide a clutch for coupling a prime mover to a driven load having fluid motor means for clutch engagement responsive to centrifugal pressure developed by rotation of the prime mover during acceleration and subsequent to prime mover starting to provide initial clutch engagement to initially accelerate the driven load and being further responsive to centrifugal pressure developed by rotation of the driven load to provide an increasing clutch power capacity for clutch engagement with continued prime mover acceleration sufficient to terminate clutch slip in a speed range approaching the prime mover's normal operating speed range and thereafter provide a maximum clutch power capacity in the latter speed range exceeding anticipated load fluctuations.

It is another object of this invention to provide a variable power capacity fluid operated clutch for coupling a prime mover to a driven load including a fluid motor operating the clutch and a fluid supply system operable to selectively deliver a high and low flow rate to the fluid motor and also to lubricate and cool the clutch with the fluid motor being responsive at the high flow rate to a centrifugal pressure developed initially by prime mover acceleration and subsequent to prime mover starting to provide the clutch with a power capacity sufficient to initially accelerate the driven load and being further responsive to a centrifugal pressure developed by accompanying acceleration of the driven load to provide an increasing clutch power capacity to accelerate the driven load and complete full clutch engagement to provide clutch lockup at a speed approaching the prime mover's normal operating speed range and at clutch lockup and with the fluid supply system conditioned for the low flow rate, the fluid motor being responsive to centrifugal pressure developed with the driving of the driven load to provide the clutch with a continued increasing power capacity until the prime mover's normal operating speed range is reached at which the clutch is provided with a selected power capacity in excess of the rated power load to prevent against clutch slippage during power load fluctuations encountered between the rated power load and the selected clutch power capacity.

These and other objects of the invention will be more apparent from the following description and drawing in which:

FIGURE 2 is an enlarged partial section of an actual structure of the clutch shown in FIGURE 1.

FIGURE 3 shows a plot of the load-deflection characteristics of the piston return spring for the clutch.

FIGURE 4 shows a plot of the power capacity-speed characteristics of the clutch and also of the heat rejection-speed characteristics of the clutch.

Figure 1:
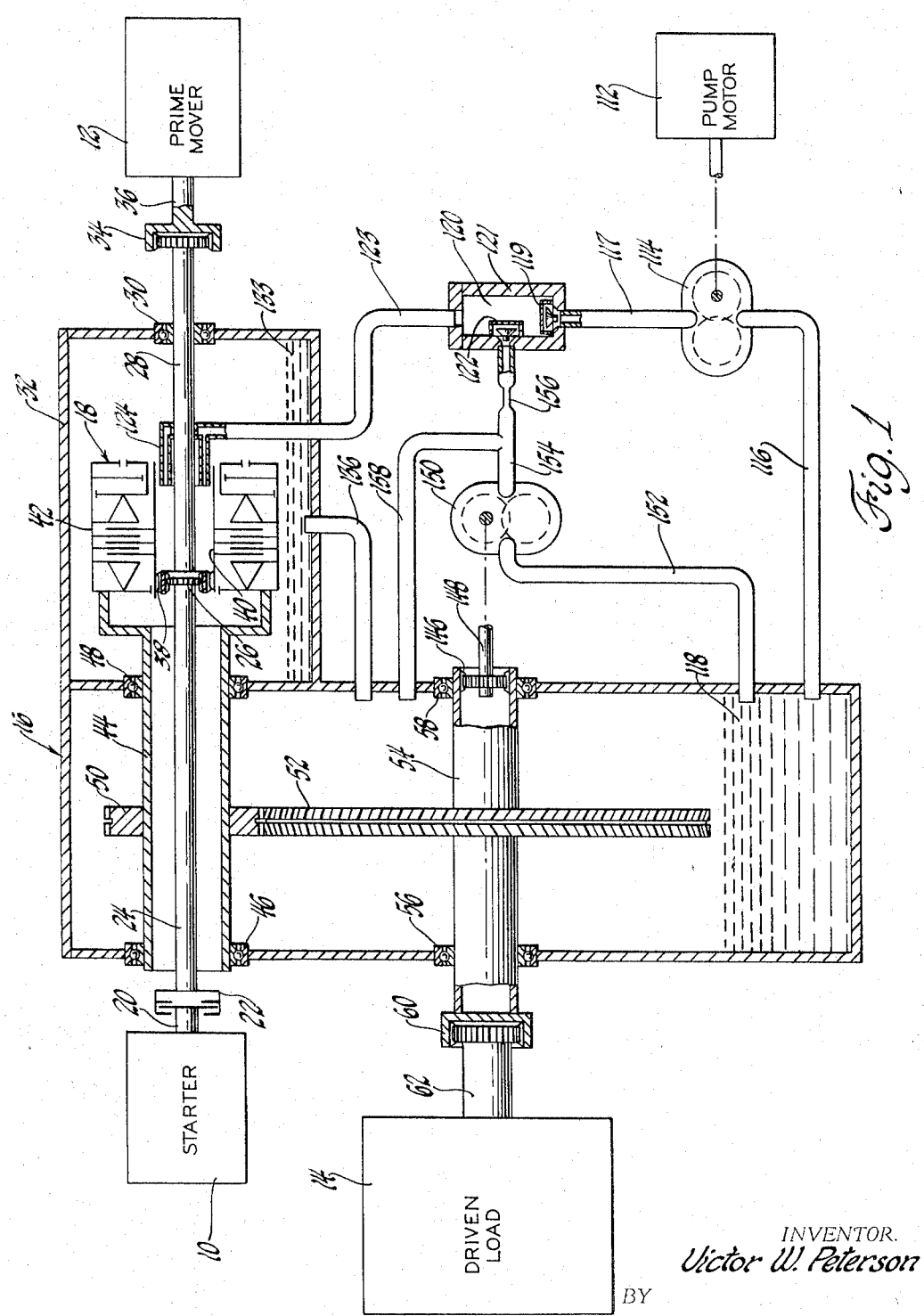
FIGURE 1 is a diagrammatic view of an industrial plant installation employing a clutch according to this invention.

Referring to FIGURE 1, the power plant installation illustrated basically comprises a starter 10, a prime mover 12, a driven load 14 and a gear box 16 having a fluid operated clutch generally designated at 18 according to this invention for transmitting drive from the prime mover 12 to the driven load 14.

The output shaft 20 of starter 10 is selectively connectible by a clutch 22 to a quill shaft 24 which is coupled at its right-hand end by a spline coupling 26 to a gear box input shaft 28 which is rotatably supported by an antifriction bearing 30 in the gear box housing 32. Shaft 28 is coupled at its right-hand end by a spline coupling 34 to the prime mover output shaft 36 and at its left-hand end is coupled by a spline coupling 38 to the driving clutch member 40 of clutch 18.

Clutch 18 whose structure and mode of operation will be described in greater detail later is operable to clutch driving member 40 to the clutch's driven member 42 which is rigidly connected to a sleeve shaft 44 surrounding quill shaft 24 and rotatably supported by antifriction bearings 46 and 48 in housing 32. A herringboned gear 50 rigidly secured to sleeve shaft 44 meshes with a larger herringboned gear 52 rigidly secured to the gear box output sleeve shaft 54 which is rotatably supported by antifriction bearings 56 and 58 in housing 32. The left-hand end of shaft 54 is coupled by a spline coupling 60 to the input shaft 62 of driven load 14 and the meshing gears 50 and 52 with clutch 18 engaged provide a reduction drive between prime mover 12 and the driven load 14.

Describing now in detail the structure of clutch 18, which is best shown in FIGURE 2, the driving clutch member 40 is an anuular member surrounding shaft 28 and the driven clutch member 42 is a cylindrical member surrounding the driving clutch member 40. Driven clutch member 42 is rigidly secured at its opposite ends to annular end members 64 and 66 and is also rigidly secured to flange 72 integral with the housing supported sleeve shaft 44. A reduced diameter shoulder of driving clutch member 40 is supported in a central bore in end member 64 by a sleeve bearing 74 and a thrust bearing 76 is provided to take thrust loading. Members 64 and 40 are retained in their relative positions by a retaining collar 78 threadably secured to the extreme left-hand end of shaft 28, collar 78 also serving to maintain spline engagement in spline coupling 38.

The fluid motor assembly to operate the clutch is housed in end member 66 which has a pair of cavities having axially spaced bores 79 and 80 separated by a radially inwardly extending rib 81. An annular apply piston 82 slidable in bore 79 has an axially extending hub 83 in which is press fitted a sleeve bearing 86 received on a reduced diameter shoulder of driving clutch member 40. Piston 82 is prevented from rotation relative to member 66 by pins, not shown. Piston 82 in conjunction with bore 79, rib 81 and suitable seals provides an expansible motor apply chamber 84 for the motor assembly. Opposite rib 81 is a ring member 90 which at its outer radius is slidably received in bore 80 and at its inner radius is retained on piston hub 83 by a retaining ring 94. Ring member 90 in conjunction with bore 80, apply piston 82 and suitable seals provides an expansible motor control chamber 96 for the motor assembly. A Belleville spring 98 located in control chamber 96 bears at its outer radius against a buttress 100 provided on rib 81 and at its inner radius is mounted on a shoulder 102 provided on the hub 104 of ring member 90 to complete the motor assembly.

To drivingly connect driving clutch member 40 to driven clutch member 42, there is provided a clutch pack having a plurality of friction plates 106 with alternate plates being splined at their inner radius to driving clutch member 40 and intermediate plates splined at their outer radius to driven clutch member 42. To apply pressure to the friction plates 106 for clutch enagement, there is provided a pressure plate 108 which bears against end member 64 and a pressure plate 110 which is moved by apply piston 82 to engage the clutch pack.

Prior to starting the prime mover 12 to drive the driven load 14, the fluid supply system to operate clutch 18, shown diagrammatically in FIGURE 1, is conditioned for a high flow rate by starting an electric motor 112 which drives a constant displacement type pump 114. Pump 114 when driven receives oil on its pump intake side via an intake line 116 from a collecting sump 118 provided in the lower portion of housing 32 and delivers this oil under pressure on its pump discharge side to a pump discharge line 117 where it is delivered through a one-way check valve 119 into a chamber 120 of the valve housing 121. This oil pressure in chamber 120 maintains a second one-way check valve 122 seated and the oil is delivered by a supply line 123 to an annular supply nozzle 124.

Nozzle 124 surrounds shaft 28 and is arranged to direct the oil to an annular supply chamber 126 which is bounded by the exterior of shaft 28 and the interior of driving clutch member 40 as best shown in FIGURE 2. From chamber 126 the oil flows radially outward through a plurality of radial ports 127 to be delivered to the clutch plates 106 for lubrication and cooling and is also delivered through a lubrication passage 128 to lubricate bearings 74 and 76. Oil in chamber 126 is also delivered to fill apply chamber 84 through circumferentially arranged radial ports 130 in driving clutch member 40, enlarged ports 131 in bearing 86 and delivery passages 134 in piston hub 83. The remainder of the oil supplied to supply chamber 126 at this high flow rate is delivered through the clearance between nozzle 124 and driving clutch member 40 to an annular recess 133 in a radially inwardly projecting annular portion of piston hub 83 and then via delivery passages 135 in piston hub 83 and recesses 137 in ring shoulder 102 to control chamber 96. Oil in control chamber 96 is returned to the collecting sump 118 by circumferentially spaced bleed passages 132 connected at points near the outer radius of control chamber 96, the exhausting oil being received by a drain sump 133 in housing 32 which drains through a drain line 136 arranged to direct the oil for gear lubrication prior to collection in sump 118 as shown in FIGURE 1.

It will be assumed at this point for illustrative purposes that the driven load 14 is a gas compressor having a 3,000 horsepower rating and that the prime mover 12 is a gas turbine having a normal operating speed of 13,800 r.p.m. with sufficient power output to drive the gas compressor.

Spring 98 has a load-deflection characteristic as shown in FIGURE 3 and is normally prestressed to hold apply piston 82 in a disengaged condition with a large spring biasing force which occurs at the peak of the curve as designated at 138, 555 lbs. at 0.20 inch deflection being used for illustration purposes. The line pressure acting in chambers 84 and 96 is negligible at the high flow rate and the full 555 lbs. spring biasing force maintains apply piston 82 in its disengaged condition.

Next the starter 10 is energized and clutch 22 is engaged to crank the gas turbine, clutch 22 being actuated in any known way, i.e. electrically, hydraulically, pneumatically or by some mechanical provision. Upon initial starting of the gas turbine, clutch 22 is disengaged and as turbine driven shaft 28 accelerates toward the gas turbine's normal operating speed of 13,800 r.p.m. and since the driving clutch member 40 rotates conjointly with shaft 28 there is developed in the ports 130 of supply chamber 126 a centrifugal pressure which is transmitted to apply chamber 84 proportional to the square of the speed of shaft 28. The centrifugal pressure is maintained by the oil flow to supply chamber 126 filling the ports 130 since the centrifugal pressure is developed within the radial depth of the supply chamber ports 130. This centrifugal pressure increases as the gas turbine accelerates until the centrifugal pressure transmitted to apply chamber 84 overcomes the 555 lbs. biasing force of spring 98 holding apply piston 82 in its disengaged condition. At this point which is selected to occur at approximately 12,000 r.p.m. of the turbine, which is a speed slightly below the turbine's normal operating speed, spring 98 is then deflected by the pressure force in apply chamber 84 acting on piston 82 along the load deflection curve shown in FIGURE 3. Spring 98 is deflected to the low point of the curve generally designated at 140 which corresponds to the small spring biasing force of 166 lbs. at 0.40 inch deflection and to movement of the apply piston 82 into its engaged condition as shown in FIGURE 2 to engage the clutch pack.

The centrifugal pressure transmitted to apply chamber 84 at 12,000 r.p.m., as will be observed by referring to FIGURE 4, provides an apply force acting on apply piston 82 sufficient to provide the clutch with a horsepower capacity of approxiamtely 250 horsepower which is that horsepower necessary to effect initial rotation of the gas compressor input shaft 62. As the driven clutch member 42 begins to rotate, chambers 84 and 96 rotate and a centrifugal pressure is then developed in these chambers to complete full clutch engagement as will now be described.

The oil flow available to control chamber 96 at the high flow rate exceeds the flow capacity of bleed passages 132 and thus both chambers 84 and 96 are filled to capacity and there is developed in these chambers centrifugal pressure proportional to the square of the driven clutch member 42. The outer radius of apply chamber 84 and the piston pressure reaction area to which this chamber is exposed are larger than those of control chamber 96. Due to centrifugal pressure gradient, apply chamber 84 has a greater average pressure than control chamber 96 and combined with the larger reaction area of apply chamber 84 relative to control chamber 96, there is provided a net effective apply force acting on apply piston 82 which increases at a faster rate than the speed of the driven clutch member 42. This apply force provides the desired clutch horsepower capacity curve as shown in FIGURE 4. This clutch capacity is sufficient to accelerate the gas compressor but not excessive so as to prevent excessive heat generation during the clutch slip engagement period as shown by the heat rejection curve in FIGURE 4. The slip engagement period continues until full engagement of the clutch is completed to provide a clutch power capacity of approximately 1200 horsepower at approximately 12,800 r.p.m. driven clutch member speed which speed is also gas turbine speed thereafter, no slip occurs in the clutch which is then effectively locked up and the heat generation falls off.

The gear box output sleeve shaft 54 drives through a spline coupling 146 the input shaft 148 of a constant displacement type pump 150. Pump 150 when driven receives oil on its pump intake side via an intake line 152 from sump 118 and delivers this oil under pressure on its pump discharge side to a pump discharge line 154. Line 154 is connectible through a flow control orifice 156 to chamber 120 by one-way check valve 122 and is also connected by a lubricant supply line 158 upstream of orifice 156 to deliver oil to lubricate the reduction gearing. Pump 150 is thus driven only when the load is being driven and with pump motor 112 operating, line pressure from line 117 acting in chamber 120 maintains valve 122 seated so that all discharge oil from pump 150 is delivered for gear lubrication.

At clutch lockup the pump motor 112 is shutdown to then permit valve 122 to be opened by oil pressure in pump 150's discharge line 154. With valve 122 opened, orifice 156 delivers a controlled low flow rate to chamber 120 and thence to supply line 123, valve 119 being seated by chamber pressure and the remaining oil in line 154 being delivered by lubricant line 158 for gear lubrication.

This low flow rate to supply line 123 provides a small amount of oil for lubrication and cooling of the clutch plates, which are no longer in slipping engagement, and maintains the apply chamber 84 filled with oil to account for any leakage which might occur. No oil flow is available to control chamber 96 at this low rate and the previously filled control chamber 96 is then emptied by bleed passages 132 so that full advantage is then taken of the centrifugal pressure developed in apply chamber 84 to give the clutch an increased horsepower capacity which will continue to increase as the now directly coupled compressor is accelerated until the normal turbine operating speed of 13,800 r.p.m. is reached. At 13,800 r.p.m. the centrifugal pressure acting in apply chamber 84 provides the clutch with a 5,000 horsepower capacity to drive the load which will be recalled as being rated at 3,000 horsepower. The 2,000 horsepower difference assures that there is no clutch slippage during the driving of the gas compressor during its normal range of operation wherein slight fluctuations in load may be encountered. The heat generation of the clutch under normal operating conditions is minimal and the oil delivered by ports 127 at the low flow rate is utilized mainly for lubrication.

On shutdown the speed of the turbine and connected compressor slows down until eventually the centrifugal pressure acting in apply chamber 84 is exceeded by the 166 lbs. spring force of spring 98 whereupon spring 98 then deflects and returns apply piston 82 to its disengaged condition to disengage the clutch plates. With the spring holding apply piston 82 once again in its disengaged condition with its 555 lbs. spring biasing force, clutch 18 is then conditioned for subsequent starting of the gas turbine and pick up and acceleration of the gas compressor.

The above-described preferred embodiment is illustrative of the invention and it is to be understood that it can be modified within the scope of the appended claims.

I claim:
1. In combination
   a. a driven load having a normal operating rated power load, a prime mover having a normal operating speed range for driving said driven load and a starter for starting said prime mover,
   b. drive means operable to connect said starter to said prime mover to start said prime mover and to disconnect said starter from said prime mover after said prime mover is started and accelerating toward said normal operating speed range,
   c. and drive transmitting means operable to connect and disconnect said prime mover and said driven load including clutch means and only fluid motor means for operating said clutch means responsive to the speed of said prime mover to provide a fluid pressure clutch engaging force to initially engage said clutch means at a speed below said normal operating speed range and provide said clutch means with a power capacity sufficient to initially accelerate said driven load, said motor means being further responsive to the speed of said driven load to increase said fluid pressure clutch engaging force proportional to the square of the speed of said driven load to provide said clutch means with an increasing power capacity to accelerate said driven load with said prime mover and complete full clutch engagement to provide clutch lockup and a direct drive through said clutch means at a speed approaching said normal operating speed range.

2. In combination
   a. a driven load having a normal operating rated power load, a prime mover having a normal operating speed range for driving said driven load and a starter for starting said prime mover,
   b. drive means operable to connect said starter to said prime mover to start said prime mover and to disconnect said starter from said prime mover after said prime mover is started and accelerating toward said normal operating speed range,
   c. drive transmitting means operable to connect and disconnect said prime mover and said driven load including clutch means and only fluid motor means for operating said clutch means operable to provide a fluid pressure clutch engaging force proportional to the square of the speed of said prime mover to initially engage said clutch means at a speed below said normal operating speed range and provide said clutch means with a power capacity sufficient to initially accelerate said driven load, said motor means being further operable to provide a fluid pressure clutch engaging force proportional to the square of the speed of said driven load to provide said clutch means with an increasing power capacity to accelerate said driven load with said prime mover with a minimum of clutch power capacity and complete full clutch engagement to provide clutch lockup and a direct drive through said clutch means at a speed approaching said normal operating speed range, d. and said motor means being operable when said clutch means is locked up to provide said clutch means with an increased power capacity which continues to increase until said normal operating speed range is reached.

3. In combination a. a driven load having a normal operating rated power load, a prime mover having a normal operating speed range for driving said driven load and a starter for starting said prime mover, b. drive means operable to connect said starter to said prime mover to start said prime mover and to disconnect said starter from said prime mover after said prime mover is started and accelerating toward said normal operating speed range, c. drive transmitting means operable to connect and disconnect said prime mover and said driven load including clutch means and fluid motor means for operating said clutch means, said fluid motor means including motor chamber means drivingly connected to said driven load operable to provide a clutch engaging force when subjected to fluid pressure, fluid supply means operatively connected to said prime mover and said fluid motor means for supplying a centrifugal fluid pressure proportional to the square of the speed of said prime mover to said fluid motor means to initially engage said clutch means at a speed below said normal operating speed range and provide said clutch means with a power capacity sufficient to initially accelerate said driven load, said fluid motor means being operable to provide a centrifugal fluid pressure clutch engaging force proportional to the square of the speed of said driven load to provide said clutch means with an increasing power capacity to accelerate said driven load with said prime mover and complete full clutch engagement to provide clutch lockup and a direct drive through said clutch means at a speed approaching said normal operating speed range, d. and said motor means being operable when said clutch means is locked up to provide said clutch means with an increased power capacity in excess of the power capacity producing clutch lockup.

4. In combination a. a driven load having a normal operating rated power load, a prime mover having a normal operating speed range for driving said driven load and a starter for starting said prime mover, b. drive means operable to connect said starter to said prime mover to start said prime mover and to disconnect said starter from said prime mover after said prime mover is started and accelerating toward said normal operating speed range, c. drive transmitting means operable to connect and disconnect said prime mover and said driven load including clutch means and fluid motor means for operating said clutch means, said fluid motor means including motor chamber means drivingly connected to said driven load operable to provide a clutch engaging force when subjected to fluid pressure, fluid supply means operatively connected to said prime mover and said fluid motor means for supplying a fluid pressure determined by the speed of said prime mover to initially engage said clutch means at a speed below said normal operating speed range and provide said clutch means with a power capacity sufficient to initially accelerate said driven load, said motor means being operable to provide a fluid pressure clutch engaging force determined by the speed of said driven load to provide said clutch means with an increasing power capacity to accelerate said driven load with said prime mover and complete full clutch engagement to provide clutch lockup and a direct drive through said clutch means at a speed approaching said normal operating speed range, d. and said motor means being operable when said clutch means is locked to provide said clutch means with an increased power capacity which continues to increase until said normal operating speed range is reached at which said clutch means is provided by said motor means with a selected power capacity in excess of said rated power load to prevent against clutch slippage during power load fluctuations encountered within the power range between said rated power load and said selected power capacity.

5. In combination a. a driven load having a normal operating rated power load, a prime mover having a normal operating speed range for driving said driven load and a starter for starting said prime mover, b. drive means operable to connect said starter to said prime mover to start said prime mover and to disconnect said starter from said prime mover after said prime mover is started and accelerating toward said normal operating speed range, c. a clutch assembly including rotatable driving clutch means connected to said prime mover, rotatable driven clutch means connected to said driven load, and clutch operating means operable to engage and disengage said driving and driven clutch means, d. said clutch operating means including fluid motor means having piston means and a pair of motor chambers to operate said piston means all rotatable with said driven clutch means, said piston means being arranged to engage said driving and driven clutch means when in an engaging condition and permitting free relative movement between said driving and driven clutch means when in a disengaged condition, spring means normally maintaining said piston means in said disengaged condition and urging reconditioning of said piston means from said engaged condition to said disengaged condition, e. fluid supply means operable to deliver fluid to said fluid motor means including a fluid supply chamber rotatable with said driving clutch means, one motor chamber when subjected to fluid pressure providing a fluid pressure force to urge said piston means from said disengaged condition to said engaged condition, the other motor chamber when subjected to fluid pressure providing a fluid pressure force acting on said piston means to oppose the fluid pressure force provided by said one motor chamber, f. said spring means maintaining said piston means in said disengaged condition when said driving clutch means is not rotating and fluid is being supplied to said fluid motor means, a port connecting said fluid supply chamber to said one motor chamber radially disposed relative to the axis of rotation of said driving clutch means chamber so that upon said driving clutch means being accelerated said one motor chamber in response to centrifugal pressure developed in said port at a speed below said normal operating speed range provides a fluid pressure force sufficient to urge said piston means from said disengaged condition to said engaged condition to initially accelerate said driven clutch means, g. the fluid in both said motor chambers developing a centrifugal pressure upon said driven clutch means being accelerated, said motor chambers being proportioned relative to each other and to said piston means so that there is provided a net effective centrifugal fluid pressure force acting on said piston means which increases with increasing speed of said driven clutch means to provide an increasing power capacity for clutch engagement until eventually full clutch engagement is completed at a speed approaching said normal operating speed range, h. and means to empty said other motor chamber at full clutch engagement so that the centrifugal pressure in said one motor chamber is made fully available to provide further increased power capacity for clutch engagement which increases until said normal operating speed range is reached.

6. In a drive transmitting assembly a. a clutch assembly including rotatable driving clutch means, rotatable driven clutch means and clutch operating means comprising fluid motor means operable to engage and disengage said driving and driven clutch means, b. means independent of said clutch means drivingly connecting said fluid motor means to said driven clutch means, c. fluid supply means operable to deliver fluid to said fluid motor means including a fluid supply chamber rotatable with said driving clutch means, d. said clutch operating means maintaining said driving and driven clutch means disengaged when said driving clutch means is not rotating and fluid is being supplied to said fluid motor means, a fluid passage connecting said fluid supply chamber to said fluid motor means radially disposed relative to the axis of rotation of said driving clutch means so that upon said driving clutch means being accelerated said fluid motor means in response to centrifugal pressure developed in said fluid passage in a first selected speed range of said driving clutch means provides a fluid pressure force to initially engage said driving and driven clutch means to accelerate said driven clutch means, e. and said driven clutch means upon being accelerated accelerating said fluid motor means to develop a centrifugal pressure in said fluid motor means which provides a fluid pressure force which increases with increasing speed of said driven clutch means to provide an increasing power capacity for clutch engagement until eventually full clutch engagement is completed in a second selected speed range of said driving clutch means to provide clutch lockup preventing further relative rotation between said driving and driven clutch means.

7. In a drive transmitting assembly a. a clutch assembly including rotatable driving clutch means, rotatable driven clutch means and clutch operating means comprising fluid motor means operable to engage and disengage said driving and driven clutch means, b. means independent of said clutch means drivingly connecting said fluid motor means to said driven clutch means, c. fluid supply means operable to deliver fluid to said fluid motor means including a fluid supply passage rotatable with said driving clutch means, d. said clutch operating means maintaining said driving and driven clutch means disengaged when said driving clutch means is not rotating and fluid is being supplied to said fluid motor means, said fluid motor means being responsive to centrifugal pressure developed in said fluid supply passage in a first selected speed range of said driving clutch means to provide a fluid pressure force to initially engage said driving and driven clutch means to accelerate said driven clutch means, e. and said driven clutch means upon being accelerated accelerating said fluid motor means to develop a centrifugal pressure in said fluid motor means which provides a fluid pressure force which increases at a rate faster than the speed of said driven clutch means to provide an increasing power capacity for clutch engagement with acceleration of said driving clutch means to complete full clutch engagement in a second selected speed range of said driving clutch means to provide clutch lockup preventing further relative rotation between said driving and driven clutch means.

8. In a drive transmitting assembly a. a clutch assembly including rotatable driving clutch means, rotatable driven clutch means and clutch operating means operable to engage and disengage said driving and driven clutch means, b. said clutch operating means including fluid motor means having piston means and a pair of motor chambers to operate said piston means all rotatable with said driven clutch means, said piston means being arranged to engage said driving and driven clutch means when in an engaging condition and permitting relatively free movement between said driving and driven clutch means when in a disengaged condition, spring means normally maintaining said piston means in said disengaged condition and urging reconditioning of said piston means from said engaged condition to said disengaged condition, c. fluid supply means operable to deliver fluid to said fluid motor means including a fluid supply chamber rotatable with said driving clutch means, one motor chamber when subjected to fluid pressure providing a fluid pressure force to urge said piston means from said disengaged condition to said engaged condition, the other motor chamber when subjected to fluid pressure providing a fluid pressure force acting on said piston means to oppose the fluid pressure force provided by said one motor chamber, d. said spring means maintaining said piston means in said disengaged condition when said driving clutch means is not rotating and fluid is being supplied to said fluid motor means, a port connecting said fluid supply chamber to said one motor chamber radially disposed relative to the axis of rotation of said driving clutch means so that upon said driving clutch means being accelerated said one motor chamber in response to centrifugal pressure developed in said port in a first selected speed range of said driving clutch means provides a fluid pressure force sufficient to urge said piston means from said disengaged condition to said engaged condition to initially engage said driving and driven clutch means to initially accelerate said driven clutch means, e. and the fluid in both said motor chambers developing a centrifugal pressure upon said driven clutch means being accelerated, said motor chambers being proportioned relative to each other and to said piston means so that there is provided a net effective centrifugal fluid pressure force acting on said piston means which increases with increasing speed of said driven clutch means to provide an increasing power capacity for clutch engagement until eventually full clutch engagement is completed in a second selected speed range of said driving clutch means to provide clutch lockup preventing further relative rotation between said driving and driven clutch means.

9. The drive transmitting assembly set forth in claim 8 wherein said piston means has a larger pressure reaction surface exposed to said one motor chamber than to said other motor chamber and said one motor chamber has a larger outer radius than said other motor chamber.

10. In a drive transmitting assembly a. a clutch assembly including rotatable driving clutch means, rotatable driven clutch means and clutch operating means operable to engage and disengage said driving and driven clutch means, b. said clutch operating means including fluid motor means having piston means and a pair of motor chambers to operate said piston means all rotatable with said driven clutch means, said piston means being arranged to engage said driving and driven clutch means when in an engaged condition and permitting relatively free movement between said driving and driven clutch means when in a disengaged condition, spring means normally maintaining said piston means in said disengaged condition and providing a large biasing force resisting conditioning of said piston means to said engaged condition and also providing a small biasing force urging reconditioning of said piston means from said engaged condition to said disengaged condition, c. fluid supply means operable to selectively deliver fluid at different flow rates to said fluid motor means and including a fluid supply chamber rotatable with said driving clutch means having a port connected at its outer radius only to one motor chamber, said fluid supply means also being connected to deliver fluid at said high and low flow rates to lubricate and cool said driving and driven clutch means, said one motor chamber when subjected to fluid pressure providing a fluid pressure force to urge said piston means from said disengaged condition to said engaged condition, the other motor chamber when subjected to fluid pressure providing a fluid pressure force acting on said piston means to oppose the fluid pressure force provided by said one motor chamber, d. said spring means maintaining said piston means in said disengaged condition when said driving clutch means is not rotating and fluid supply to said fluid motor means is at one flow rate, said port being radially disposed relative to the axis of rotation of said driving clutch means so that at said one flow rate and upon said driving clutch means being accelerated said one motor chamber in response to centrifugal pressure developed in said port in a first selected speed range of said driving clutch means provides a fluid pressure force sufficient to overcome said large biasing force of said spring means to urge said piston means from said disengaged condition to said engaged condition to initially engage said driving and driven clutch means to accelerate said driven clutch means, e. said piston means having a larger pressure reaction surface exposed to said one motor chamber than to said other motor chamber, said one motor chamber having a large outer radius than said other motor chamber, the fluid in both said motor chambers developing a centrifugal pressure upon said driven clutch means being accelerated whereby there is provided a net effective centrifugal fluid pressure force acting on said piston means which increases at a rate faster than the speed of said driven clutch means to provide an increasing power capacity for clutch engagement until eventually full clutch engagement is completed in a second selected speed range of said driving clutch means to provide clutch lockup preventing further relative rotation between said driving and driven clutch means, f. and means for emptying said other motor chamber of fluid upon the flow rate to said fluid motor means being reduced at clutch lockup to another flow rate so that the centrifugal pressure in said one motor chamber acts to provide an increased power capacity for clutch engagement and which increases with increasing speed of said driving clutch means past said second selected speed range until a third selected speed range is reached.

11. In a drive transmitting assembly a. a clutch assembly including rotatable driving clutch means, rotatable driven clutch means and clutch operating means operable to engage and disengage said driving and driven clutch means, b. said clutch operating means including fluid motor means having piston means and a pair of motor chambers to operate said piston means all rotatable with said driven clutch means, said piston means being arranged to engage said driving and driven clutch means when in an engaged condition and permitting relatively free movement between said driving and driven clutch means when in a disengaged condition, variable rate piston biasing means normally maintaining said piston means in said disengaged condition and providing a large biasing force resisting conditioning of said piston means to said engaged condition and also providing a small biasing force urging reconditioning of said piston means from said engaged condition to said disengaged condition, c. fluid supply means operable to selectively deliver fluid at different flow rates to said fluid motor means and including a fluid supply chamber rotatable with said driving clutch means having a port connected at its outer radius to one motor chamber, said one motor chamber when subjected to fluid pressure providing a fluid pressure force to urge said piston means from said disengaged condition to said engaged condition, the other motor chamber when subjected to fluid pressure providing a fluid pressure force acting on said piston means to oppose the fluid pressure force provided by said one motor chamber, d. said piston biasing means maintaining said piston means in said disengaged condition when said driving clutch means is not rotating and fluid supply to said fluid motor means is at one flow rate, said port being radially disposed relative to the axis of rotation of said driving clutch means so that at said one flow rate and upon said driving clutch means being accelerated said one motor chamber in response to centrifugal pressure developed in said port in a first selected speed range of said driving clutch means provides a fluid pressure force sufficient to overcome said large biasing force of said piston biasing means to urge said piston means from said disengaged condition to said engaged condition to initially engage said driving and driven clutch means to accelerate said driven clutch means, e. the fluid in both said motor chambers developing a centrifugal pressure upon said driven clutch means being accelerated, said motor chambers being proportioned relative to each other and to said piston means so that there is provided a net effective centrifugal fluid pressure force acting on said piston means which increases at a rate faster than the speed of said driven clutch means to provide an increasing power capacity for clutch engagement until eventually full clutch engagement is completed in a second selected speed range of said driving clutch means to provide clutch lockup preventing further relative rotation between said driving and driven clutch means, f. means for emptying said other motor chamber of fluid upon the flow rate to said fluid motor means being changed at clutch lockup to another flow rate lower than said one flow rate so that the centrifugal pressure in said one motor chamber is fully available to provide an increased power capacity for clutch engagement and which increases with increasing speed of said driving clutch means past said second selected speed range until a third selected speed range is reached, g. and the centrifugal pressure in said one motor chamber upon said driving and driven clutch means being decelerated from said third selected speed range decreasing until eventually said low biasing force of said piston biasing means overcomes the decreasing fluid pressure force provided by said one motor chamber to urge said piston means from said engaged condition to said disengaged condition.

12. In a drive transmitting assembly a. a clutch assembly including rotatable driving clutch means, rotatable driven clutch means and clutch operating means operable to engage and disengage said driving and driven clutch means,
b. said clutch operating means including fluid motor means fixed for rotation with said driven clutch means and having a pair of motor chambers, one motor chamber when subjected to fluid pressure providing an apply force for clutch engagement, the other motor chamber when subjected to fluid pressure providing a force opposing said apply force,
c. and fluid means for selectively filling both said motor chambers with fluid and for filling only said one motor chamber with fluid, said fluid means including fluid pressure inducing means fixed to said driving clutch means and connected to said one motor chamber for establishing a pressure proportional to driving clutch means speed in said one motor chamber.

References Cited by the Examiner

UNITED STATES PATENTS

| | | | |
|---|---|---|---|
| 2,328,092 | 8/1943 | Nutt et al. | 192—85 X |
| 2,422,155 | 6/1947 | Wemp | 192—105 |
| 2,440,624 | 4/1948 | Wemp. | |
| 2,562,515 | 7/1951 | Wemp | 192—105 |
| 2,916,122 | 12/1959 | Hindmarch | 192—106 X |
| 3,007,562 | 11/1961 | Aschaver | 192—86 X |

FOREIGN PATENTS 379,460   8/1923   Germany.

DAVID J. WILLIAMOWSKY, *Primary Examiner.*

BENJAMIN W. WYCHE, III, *Examiner.*